3,592,804
N-(SUBSTITUTED-α-PENICILLOYL)-DIAMINO CARBOXYLIC ACIDS
Peter Quitt, Basel, and Karl Vogler, Riehen, Switzerland, assignors to Hoffmann-La Roche Inc., Nutley, N.J.
No Drawing. Filed Nov. 19, 1968, Ser. No. 777,178
Claims priority, application Switzerland, Jan. 4, 1968, 88/68
Int. Cl. A61k 27/00; C07c 103/52; C07d 91/18
U.S. Cl. 260—112.5
10 Claims

ABSTRACT OF THE DISCLOSURE

Penicilloic acid derivatives of the formula

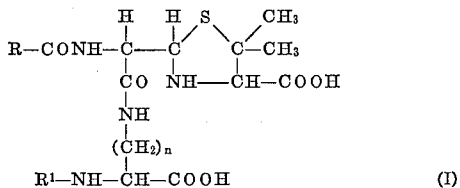

wherein $n$ is an integer from 2 to 4 and R in preferred embodiments is benzyl, phenoxymethyl or allylthiomethyl and $R_1$ is hydrogen or lower acyl and methods for their preparation are disclosed. These penicilloic acid derivatives are useful for inhibiting allergic reactions which occur on administration of penicillins.

The present invention is concerned with penicilloic acid derivatives of the general formula

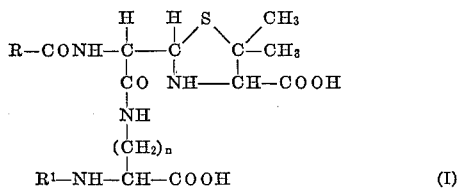

wherein $n$ is an integer from 1 to 4; R is 2-pentenyl, n-pentyl, n-heptyl, allylthiomethyl, 5 - amino-5-carboxypentyl, benzyl, carboxybenzyl, α-aminobenzyl, phenoxybzenzyl, phenoxymethyl, α-phenoxyethyl, α-phenoxypropyl, 2,6 - dimethoxyphenyl, 2-ethoxy-1-naphthyl, 3-carboxy-2-quinoxalinyl, 5-methyl-3-phenyl-4-isoxazolyl, 3-(2-chlorophenyl)-5-methyl-4-isoxazolyl or 3 - (2,6-dichlorophenyl)-5-methyl-4-isoxazolyl; and $R^1$ is hydrogen or lower acyl, and salts thereof.

As used herein the term "lower acyl" comprehends an acyl radical containing from 1 to 6 carbon atoms, such as, for example, formyl, acetyl, propionyl, butyryl, isobutyryl, valeryl, isovaleryl, caproyl and isocaproyl.

Preferred embodiments of the present invention relating to compounds of Formula I above are obtained when substituent R is benzyl, α-aminobenzyl, phenoxymethyl, α-phenoxyethyl, 2,6 - dimethoxyphenyl, 2 - ethoxy-1-naphthyl and 3-(2-chlorophenyl)-5-methyl-4-isoxazolyl.

A preferred group of compounds of Formula I is obtained when $n$ has a value of 2 to 4 and the aminocarboxylic acid component is present in the L-form.

As indicated previously, the compounds of Formula I can also exist as salts, most preferably as pharmaceutically acceptable salts. Examples of representative salts include organic amino salts, e.g., the bis-benzylammonium and bis-dicyclohexylammonium salts or mineral salts, such as, for example, the sodium, potassium or calcium salts. Compounds of Formula I in the form of a non-pharmaceutically acceptable salt may readily be converted into the form of a pharmaceutically acceptable salt by ion exchange procedures well known in the art.

Representative examples of compounds corresponding to Formula I are:

$N^6$-(benzyl-α-penicilloyl)-L-lysine
$N^6$-(benzyl-α-penicilloyl-$N^2$-formyl-L-lysine
$N^6$-(benzyl-α-penicilloyl)-$N^2$-acetyl-L-lysine
$N^6$-(benzyl-α-penicilloyl)-$N^2$-acetyl-D-lysine
$N^5$-(benzyl-α-penicilloyl)-$N^2$-butyryl-L-ornithine
$N^4$-(benzyl-α-penicilloyl)-$N^2$-caproyl-D-α-γ-diaminobutyric acid
$N^6$-(2-pentenyl-α-penicilloyl)-L-lysine
$N^6$-(2-pentenyl-α-penicilloyl)-$N^2$-acetyl-L-lysine
$N^6$-(2-pentenyl-α-penicilloyl)-$N^2$-formyl-L-lysine
$N^6$-(allylthiomethyl-α-penicilloyl)-L-lysine
$N^6$-(allylthiomethyl-α-penicilloyl)-$N^2$-acetyl-L-lysine
$N^6$-(allylthiomethyl-α-penicilloyl)-$N^2$-formyl-L-lysine
$N^6$-(phenoxymethyl-α-penicilloyl)-$N^2$-acetyl-L-lysine
$N^6$-(phenoxymethyl-α-penicilloyl)-$N^2$-butyryl-L-lysine
$N^6$-(α-aminobenzyl-α-penicilloyl)-$N^2$-acetyl-L-lysine
$N^6$-(2,6-dimethoxyphenyl-α-penicilloyl)-$N^2$-acetyl-L-lysine
$N^5$-(2-ethoxy-1-naphthyl-α-penicilloyl)-$N^2$-acetyl-L-ornithine
$N^6$-(3-carboxy-2-quinoxalinyl-α-penicilloyl)-$N^2$-acetyl-L-lysine
$N^6$-(5-methyl-3-phenyl-4-isoxazolyl-α-penicilloyl)-$N^2$-acetyl-L-lysine
$N^6$-[3-(2-chlorophenyl)-5-methyl-4-isoxazolyl-α-penicilloyl]-$N^2$-acetyl-L-lysine
$N^5$-[3-(2,6-dichlorophenyl)-5-methyl-4-isoxazolyl-α-penicilloyl]-$N^2$-formyl-L-ornithine.

The compounds of the present invention corresponding to Formula I are prepared by reacting a compound of the general formula

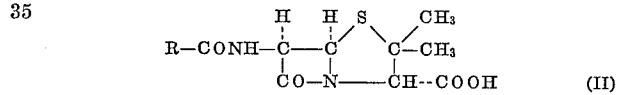

wherein R is as above, with a diaminocarboxylic acid derivative of the general formula

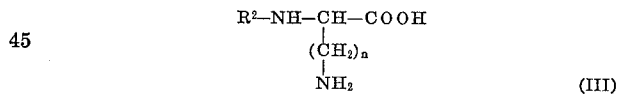

wherein $n$ is as above and $R^2$ is lower acyl or an amino-protecting group.

When $R^2$ is an amino-protecting group and is thus contained in the reaction product, it is desired that this group be split off subsequent to the reaction and, if desired, the reaction product may be converted into a salt by procedures known in the art.

The reaction of compounds of Formula II with compounds of Formula III above may be conveniently undertaken in an aqueous-alkaline medium. The reaction temperature is preferably in the range of from about 5 to about 30° C. The compounds of Formula III can exist in optically active form or as the racemate. For the purposes of the present invention it is preferred that a diaminocarboxylic acid derivative belonging to the L-series be employed.

In the preparation of a compound of Formula I wherein $R^1$ is hydrogen, it is preferred to employ as a starting material a compound of Formula III in which $R^2$ represents an amino-protecting group. The protecting group is split off after reaction with the compound of Formula II has been effected. Suitable amino-protecting groups are those known per se from peptide chemistry, for example, the tert.-butyloxycarbonyl group or the benzyloxycarbonyl group. The cleavage of the protecting groups can be effected in the manner known per se. A tert-butyloxycarbonyl group can, for example, be removed by means of trifluoroacetic acid. Similarly, the benzyloxycarbonyl group can be cleaved by means of catalytic hydrogenation.

The starting materials for the process in accordance with the present invention can, insofar as they are not known, be manufactured in the manner known per se.

Compounds of Formula I above are useful for inhibiting allergic reactions which occur on administration of penicillins.

Thus, in vitro the precipitation of antibenzylpenicilloyl antibodies (obtained from rabbit and guinea-pig sera) by benzylpenicilloyl antigens could be inhibited by means of $N^6$ - (benzyl - $\alpha$-penicilloyl)-$N^2$-formyl-L-lysine. Furthermore, it was found that the aforesaid penicilloic acid derivative inhibited the haemagglutination by benzylpenicilloyl antigens of erythrocytes preincubated with antibenzylpenicilloyl antibodies. The contraction of the guinea-pig ileum passively sensitized by means of antibenzylpenicilloyl rabbit $\gamma$-globulin caused by benzylpenicilloyl antigens (Schultz-Dale experiment) could likewise be inhibited. In vivo, penicillin-allergic reactions such as, for example the passive skin anaphylaxis of the guinea-pig as well as the urticarial skin reaction of the penicillin-allergic human could be inhibited.

The compounds of Formula I as indicated are useful as inhibitors of allergic reactions which occur on administration of penicillins. These compounds can be used in the form of conventional pharmaceutical preparations; for example, the aforesaid compounds can be mixed with conventional organic or inorganic, inert pharmaceutical carriers suitable for parenteral or enteral administration. They can be administered in conventional pharmaceutical forms, preferably parenterally, for example, solutions, suspensions or emulsions. Moreover, the pharmaceutical composition containing compounds of this invention can be subjected to conventional pharmaceutical expedients such as sterilization, and can contain conventional pharmaceutical excipients such as preservatives, stabilizing agents, wetting agents, emulsifying agents, salts for the adjustment of osmotic pressure, or buffers. The compositions can also contain other therapeutically active materials.

A suitable pharmaceutical dosage unit can contain from about 50 mg. to about 500 mg. of the aforesaid compounds of Formula I. Suitable parenteral dosage regimens in warm-blooded mammals comprise from about 1 mg./kg. per day to about 10 mg./kg. per day. However, for any particular subject, the specific dosage regimen should be adjusted according to individual need and the professional judgment of the person administering or supervising the administration of the aforesaid compounds. It is to be understood that the dosages set forth herein are exemplary only in that they do not, to any extent, limit the scope or practice of this invention.

The following examples are illustrative, but not limitative, of this invention. All temperatures are stated in degrees centigrade.

EXAMPLE 1

7.1 g. of benzylpenicillin sodium salt and 4.9 g. of $N^2$-tert.-butyloxycarbonyl-L-lysine were dissolved in 60 ml. of water and treated with stirring at 5° with 20 ml. of N sodium hydroxide solution. After 15 minutes, the pH was adjusted to 3–4 with solid tartaric acid and the solution extracted with ethyl acetate. After washing, drying and evaporation of the ethyl acetate, there remained 12.5 g. of foamy substance which can be used directly for the next stage. By addition of benzylamine, there was obtained the crystalline mono-benzylammonium salt of melting point 113–115°, $[\alpha]_D^{26}=+70.1°$ (c.=1.08 in methanol).

11.4 g. of the crude acid were shaken with 30 ml. of trifluoroacetic acid at room temperature for 20 minutes. After decantation, the residue was washed with ether and dried overnight in the vacuum desiccator over potassium hydroxide. The residue was dissolved in 10 ml. of pyridine and left at 2–4° for 3 days. 2.5 g. of $N^6$-(benzyl-$\alpha$-penicilloyl)-L-lysine of melting point 220–222° (dec.) are thus obtained, $[\alpha]_D^{24}=+77.6°$ (c.=0.94 in glacial acetic).

EXAMPLE 2

87 g. of $N^2$-formyl-L-lysine were dissolved in 400 ml. of water, treated with 186 g. of benzylpenicillin potassium salt and immediately afterwards with 500 ml. of 1 N sodium hydroxide solution, and stirred for 10 minutes with cooling, so that the temperature remained between 15 and 20°. A mixture of 3 liters of ethyl acetate and 300 ml. of methanol and simultaneously 500 ml. of 3 N sulfuric acid were thereafter added. The mixture was stirred for a further 5 minutes and the aqueous phase separated off. The organic phase was stirred with saturated aqueous sodium sulfate solution for a further 5 minutes, dried with sodium sulfate and evaporated in vacuum. The residue was taken up in 1.3 liters of ethanol, treated with 109 ml. of benzylamine and thereafter at 40° with ether up to incipient turbidity. There was thus obtained 245 g. of $N^6$-(benzyl-$\alpha$-penicilloyl)-$N^2$-formyl-L-lysine bis-benzylammonium salt of melting point 142–145°

$$[\alpha]_D^{25}=+66.6°$$

(c.=1 in water).

1.35 kg. of $N^6$-(benzyl - $\alpha$ - penicilloyl)-$N^2$-formyl-L-lysine bis-benzylammonium salt were dissolved in 9 liters of methanol and treated with a solution of 276 g. of calcium chloride dihydrate in 1.5 liters of methanol with stirring. The solids were filtered off and recrystallized from water/isopropanol (1:2). There were obtained 700 g. of $N^6$ - (benzyl - $\alpha$ - penicilloyl) - $N^2$ - formyl - L -lysine calcium salt of melting point 260–270° (dec.), $[\alpha]_D^{25}=+81.1°$ (c.=1 in water).

This calcium salt can also be obtained from the acid obtained as the crude evaporation residue in the first paragraph of this example in isopropanol/water by means of the addition of molar amounts of calcium acetate or calcium hydroxide.

EXAMPLE 3

56 G. of $N^2$-acetyl-L-lysine, dissolved in 300 ml. of water, were treated with 112 g. of benzylpenicillin potassium salt and immediately afterwards with 300 ml. of 1 N sodium hydroxide solution. The mixture was stirred for 10 minutes at 15° and thereafter poured into a stirred mixture of 300 ml. of 3 N sulfuric acid and 400 ml. of ethyl acetate and filtered off after 10 minutes. The residue was crystallized from methanol/ethyl acetate to give 113 g. of $N^6$ - (benzyl-$\alpha$-penicilloyl)-$N^2$-acetyl-L-lysine of melting point 144–146° obtained in two fractions, $[\alpha]_D^{25}=+92°$ (c.=1 in 10 percent potassium bicarbonate).

EXAMPLE 4

In the manner stated in Example 2, from 58.3 g. of $N^2$-acetyl-D-lysine and 115 g. of benzylpenicillin potassium salt there were obtained 92.6 g. of $N^6$-(benzyl-$\alpha$-penicilloyl)-$N^2$-acetyl - D - lysine bis - benzylammonium salt. Melting point 133–137°, $[\alpha]_D^{25}=+61.4°$ (c.=1 in water).

EXAMPLE 5

The procedure stated in Example 2, starting from 11.6 g. of $N^2$-butyryl-L-ornithine and 21.4 g. of benzylpenicillin potassium salt yielded 31 g. of $N^5$-(benzyl-$\alpha$-penicilloyl)-$N^2$ - butyryl - L - ornithine bis-benzylammonium salt. Melting point 110–115°, $[\alpha]_D^{25}=+61.0°$ (c.=1 in water).

EXAMPLE 6

In accordance with Example 2, from 18.3 g. of $N^2$-caproyl-D-$\alpha,\gamma$-diaminobutyric acid and 31.4 g. of benzylpenicillin potassium salt and salt-formation with dicyclohexylamine there were obtained 37.4 g. of $N^4$-(benzyl-α-penicilloyl) - $N^2$ - caproyl - D - α,γ - diamino - butyric acid bis-dicyclohexylammonium salt. Melting point 167–173°, $[α]_D^{25} = +60.0°$ (c.=1 in alcohol).

EXAMPLE 7

The procedure of Example 3 starting with 22.2 g. of phenoxymethyl pencillin, 10.9 g. of $N^2$-acetyl-L-lysine and 115 ml. 1 N sodium hydroxide solution yielded 14 g. $N^6$ - (phenoxymethyl - α - penicilloyl) - $N^2$ - acetyl - L-lysine with a melting point of 197–199° $[α]_D^{25} = +82.5°$ (c.=1.0 in 10 percent potassium bicarbonate).

EXAMPLE 8

Employing the procedure of Example 3 starting with 21.8 g. of allylthiomethyl penicillin sodium salt and 11.7 g. $N^2$-acetyl-L-lysine, yielded 9 g. $N^6$-(allylthiomethyl-α-penicilloyl)-$N^2$-acetyl - L - lysine melting at 125–127°, $[α]_D^{25} = +80.0°$ (c.=1.0 in 10 percent potassium bicarbonate).

EXAMPLE 9

Dry ampoules containing 100 mg. of $N^6$-(benzyl-α-penicilloyl)-$N^2$-formyl-L-lysine calcium salt are prepared by conventional techniques. Prior to use, 1–5 ml. of water or physiological salt solutions are added.

What is claimed is:
1. A compound of the formula

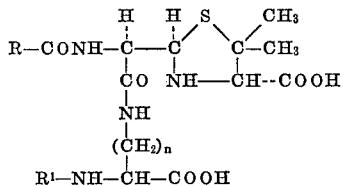

wherein n is an integer in the range of from 2 to 4, R is 2-pentenyl, n-pentyl, n-heptyl, allylthiomethyl, 5-amino-5-carboxypentyl, benzyl, carboxybenzyl, α-aminobenzyl, phenoxybenzyl, phenoxymethyl, α-phenoxyethyl, α-phenoxypropyl, 2,6-dimethoxyphenyl, 2-ethoxy-1-naphthyl, 3-carboxy-2-quinoxalinyl, 5-methyl-3-phenyl-4-isoaxazolyl, 3 - (2 - chlorophenyl)-5-methyl-4-isoxazolyl or 3-(2,6-dichlorophenyl)-5-methyl-4-isoxazolyl; and $R^1$ is hydrogen or lower alkanoyl and pharmaceutically acceptable salts thereof.

2. $N^6$-(benzyl-α-penicilloyl)-L-lysine.
3. $N^6$-(benzyl-α-penicilloyl)-$N^2$-formyl-L-lysine bis-benzylammonium salt.
4. $N^6$(benzyl-α-penicilloyl)-$N^2$-formyl-L-lysine calcium salt.
5. $N^6$-(benzyl-α-penicilloyl)-$N^2$-acetyl-L-lysine.
6. $N^6$-(benzyl-α-penicilloyl)-$N^2$-acetyl-D-lysine bis-benzylammonium salt.
7. $N^5$-(benzyl-α-penicilloyl)-$N^2$-butyryl-L-ornithine bis-benzylammonium salt.
8. $N^4$-(benzyl-α-penicilloyl)-$N^2$-caproyl-D-α,γ-diaminobutyric acid bis-dicyclohexylammonium salt.
9. $N^6$-(phenoxymethyl-α-penicilloyl)-$N^2$-acetyl-L-lysine.
10. $N^6$-(allylthiomethyl-α-penicilloyl)-$N^2$-acetyl-L-lysine.

References Cited

Levine, J. Med. Pharm. Chem. 5, 1025–1034 (1962).
Parker et al., J. Exptl. Med. 115, 805 (1962).
Schneider et al., Helv. Chim. Acta 49, 1689–1694 (1966).
Schneider et al., Helv. Chim. Acta 49, 1695–1706 (1966).
Schneider et al., Biochim. Biophys. Acta 168, 27–35 (1968).

ELBERT L. ROBERTS, Primary Examiner

M. M. KASSENOFF, Assistant Examiner

U.S. Cl. X.R.

260—266, 306.7; 424—10, 177, 250, 270, 271